United States Patent [19]
Smith et al.

[11] 3,961,153
[45] June 1, 1976

[54] MACHINE FOR FABRICATING A WIRE NETWORK

[75] Inventors: Elmer O. Smith, Compton; Samuel Weinstein, Culver City, both of Calif.

[73] Assignee: TRW Inc., Redondo Beach, Calif.

[22] Filed: May 24, 1974

[21] Appl. No.: 473,109

[52] U.S. Cl. .................................. 219/56; 29/600; 219/87; 343/897
[51] Int. Cl.² ......................................... B23K 11/10
[58] Field of Search ................. 29/600; 219/56, 58, 219/87; 343/897

[56] References Cited
UNITED STATES PATENTS

| | | | |
|---|---|---|---|
| 1,961,991 | 5/1934 | Southwell | 219/56 X |
| 2,332,022 | 10/1943 | Southwick | 219/56 |
| 2,390,174 | 12/1945 | Roemer | 219/56 |
| 2,411,988 | 12/1946 | Drieschman et al. | 219/56 |
| 2,748,238 | 5/1956 | Zaphiropoulos | 219/58 |
| 2,955,192 | 10/1960 | Cohen | 219/58 |
| 3,194,935 | 7/1965 | Stoeckel | 219/56 |
| 3,370,150 | 2/1968 | Nordgren | 219/56 X |
| 3,469,059 | 9/1969 | Sowa | 219/87 X |
| 3,676,632 | 7/1972 | Ritter et al. | 219/58 |
| 3,707,720 | 12/1972 | Staehlin et al. | 343/897 X |

*Primary Examiner*—Elliot A. Goldberg
*Assistant Examiner*—N. D. Herkamp
*Attorney, Agent, or Firm*—Daniel T. Anderson; Donald R. Nyhagen; Jerry A. Dinardo

[57] ABSTRACT

A welding method and machine for fabricating a wire network by supporting a group of wires in spaced side by side relation, intermittently advancing the wire group endwise through a welding station, and following each advance of the wire group, supporting at least one wire within the welding station in a transverse welding position relative to the group wires, such that the group and transverse wires cross one another, and welding the group and transverse wires to one another at their crossing points to form a welded wire network comprising the group wires and a multiplicity of transverse wires spaced along and welded to the group wires. The invention is described in connection with fabricating gore shaped wire networks which may be assembled to form a parabolic antenna reflector.

8 Claims, 11 Drawing Figures

MACHINE FOR FABRICATING A WIRE NETWORK

BACKGROUND OF THE INVENTION

1. Field of the Invention

This invention relates generally to the welding art and more particularly to a welding machine and method for fabricating wire networks.

2. Prior Art

Simply stated, a wire network is a structure comprising two groups of wires which cross one another at intervals and are joined at their crossing points. In the more common wire networks, the wires of each group are parallel and uniformly spaced, and the wires of the two groups are orthogonal to one another. As will appear from the ensuing description, however, this invention encompasses within its scope the fabrication of wire networks with other network wire arrangements.

It will also become apparent from the ensuing description that the welding method and machine of the invention may be utilized to fabricate wire networks for various purposes. One particularly useful application of the invention is fabricating gore shaped wire networks which may be assembled to form a parabolic antenna reflector. The invention will be described in the context of this particular application.

Certain types of directional antennas have a parabolic reflector, commonly referred to as a "dish", and a radiation emitting-receiving element situated at the focal point of the dish. The dish focuses incoming radiation at the antenna element and reflects emitted radiation from the element in the form of a radiation beam. One form of such a parabolic antenna dish has parabolically curved ribs extending radially from a central hub and a wire network gores between and joined along their radial edges to the ribs.

The wire network of each gore has wires extending radially of the gore and other wires orthogonal to the radial wires extending circumferentially or hoopwise of the gore. These radial and hoop wires cross one another and are mechanically and electrically joined at their crossing points. The adjacent gores are electrically connected to one another.

SUMMARY OF THE INVENTION

This invention provides a welding method and machine for fabricating a wire network by supporting a group of wires in spaced side by side relation, intermittently advancing the wire group endwise through a welding station to locate successive laterally aligned portions of the wires within the station, and following each advance of the wire group, supporting at least one wire within the welding station in a transverse welding position relative to the group wires, such that the transverse and group wires cross one another, and welding the group and transverse wires to one another at their crossing points to form a welded wire network comprising the group wires and a multiplicity of transverse wires spaced along and welded to the group wires.

The welding machine has a frame mounting first wire holding means for supporting and intermittently advancing the group wires and a second wire holding means for supporting the transverse wires. Also mounted on the frame are welding means for welding the group and transverse wires to one another at their crossing points. The welding means of the described welding machine comprises a welding electrode which travels along each transverse wire in welding position within the welding station and is extended into welding relation with the group and transverse wires at each crossing point to weld the crossing wires.

As noted earlier, the invention will be described in connection with fabricating gore shaped wire networks for a parabolic antenna reflector dish. Each of these gores has wires extending radially of the gore and wires orthogonal to the radial wires extending in the circumferential or hoop direction of the gore. The radial and hoop wires of the gore correspond to the group and transverse wires, respectively, referred to in the earlier discussion. In addition to the radial and hoop wires, each gore comprises a pair of metallic radial edge strips which extend along the radial edges of the gore and to which the hoop wires are secured.

In the described gore network welding machine, the holding means for the group or radial wires of the gore being fabricated, comprises a rotory radial wire feed take-up drum at one side of the welding station and a wire guide at the opposite side of the station. The radial wires are attached at one end to spaced points of the drum and extend in spaced parallel relation through the welding station and wire guide to wire supply and tensioning means which exert a controlled tension load on the wires. Intermittent endwise advancing of the radial wires through the welding station is accomplished by rotation of the drum.

The holding means for the transverse or hoop wires of the gore comprises a pair of adjustable slides at the welding station between which the hoop wires extend in orthogonal crossing relation to the radial wires. The hoop wires pass through wire guides on the slides and are fixed at one end to one slide and at the other end to tensioning means which exerts a controlled tension load on the wire. The radial edge strips are attached at one end of the take-up drum and extend in converging relation through the welding station to strip supply means, such as strip supply cartridges. Positioned between the hoop wire slides are a pair of adjustable edge strip locating slides having means for positioning the strips in fixed relation to one another and to the radial wires.

The welding means of the described welding machine comprises a welding unit mounted on the machine frame for movement through the welding station parallel to the hoop wires and having a welding electrode overlying each hoop wire in welding position within the station. Movement of the welding unit through the welding station between the edge strips occurs in an automatic mode under the control of a radial wire sensor in such a way that the unit is momentarily arrested at each wire crossing point, and while the unit is stationary, each welding electrode is extended to welding position wherein the electrode presses the underlying crossing wires against an underlying anvil bar to effect welding of the crossing wires to one another. The welding unit is positioned and operated in a manual mode to weld the hoop wires to the edge strips.

In operation of the gore network welding machine, a pair of gore edge strips and a number of gore radial wires are placed in the machine with the edge strips diverging toward the take-up drum at an angle corresponding to the included angle of the finished gore and spaced at the welding station, by adjustment of the edge strip locating slides, a distance equal to the width of the wide end of the finished gore. Thereafter one or more hoop wires are placed in welding position over and in orthogonal relation to the radial wires. The welding unit is then operated in the manual mode to weld the hoop wires to one edge strip, after which the welding unit is set in the automatic mode to effect intermittent movement of the unit through the welding station and welding of the wire crossing points in the manner just explained. Thereafter, the welding unit is restored to the manual mode to weld the hoop wires to the remaining edge strip, whereupon the unit is returned to its initial position. The welding operation constitutes one welding cycle of the machine.

Upon completion of the welding cycle, the take-up drum is rotated to advance the edge strips, radial wires, and welded hoop wire or wires through the welding station a distance related to the desired hoop wire spacing of the finished gore. The edge strip locating slides are readjusted to provide an edge strip spacing at the welding station equal to the width of the finished gore at the corresponding radial position along the gore. One or more new hoop wires are then placed in the hoop wire holding means, and the second welding cycle is initiated. This action is repeated until the gore is completed.

Following the last welding cycle of the machine, the welded structure is removed from the take-up drum and the wires are cut off flush with the edge strips to complete the gore fabrication.

DESCRIPTION OF THE PREFERRED EMBODIMENTS

Figure 1:
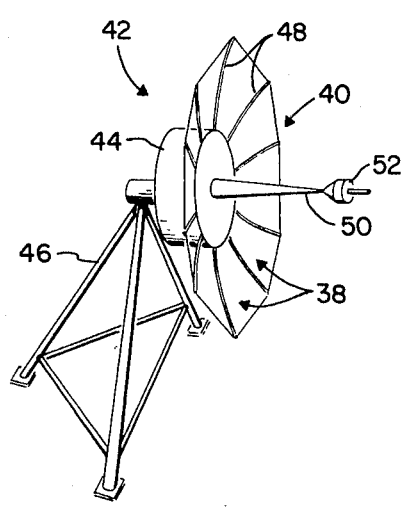
FIG. 1 is a perspective view of an antenna embodying a parabolic reflector dish comprising wire network gores of the kind which may be fabricated by this invention.

Turning now to the drawings and particularly to FIGS. 3 through 8, there is illustrated a welding machine 10 according to the invention for fabricating a wire network comprising crossing wires which are welded to one another at their crossing points. Generally speaking, the welding machine has a frame 12 with a welding station 14. Mounted on the frame are wire holding means 16 for supporting a group of wires 18 in spaced side by side relation within the welding station 14. This wire holding means includes means 19 for intermittently advancing the wires endwise a known distance through the station. Additional wire holding means 20 are mounted on the frame for supporting at least one wire 22 within the welding station 14 in transverse crossing relation to the group wires 18. In the particular welding machine illustrated, the holding means 20 supports two transverse wires 22 in side by side relation within the welding station. The wire holding means 16, 20 include means 16a, 20a, respectively, for exerting controlled tension loads on the wires 18, 22.

The machine is equipped with welding means 24 for welding the group and transverse wires 18, 22 to one another at their crossing points. This welding means comprises a welding unit 26 supported on the machine frame 12 for movement through the welding station 14 in the endwise direction of the transverse wires 22. Welding unit 26 is driven along the frame by a reversible intermittent drive mechanism 28 controlled by a group wire sensing system including a group wire sensor 30. During travel of the welding unit 26 through the welding station 14, the sensor 30 senses the group wires 18 in succession to generate electrical stop signals, and the sensing system is operative in response to each stop signal to momentarily inactivate the drive mechanism 28 and thereby momentarily arrest the welding unit 26.

The welding unit 26 has a welding head 32, including a pair of welding electrodes 34 which overlie and traverse the transverse wires 22 endwise as the unit travels through the welding station 14. These welding electrodes are so located relative to the group wire sensor 30 that while the welding unit is arrested at each group wire, the electrodes are situated directly over the crossing points of their respective transverse wires 22 and the adjacent group wire. The welding head 32 includes an actuator which is operable each time the unit is arrested to extend the electrodes 34 downwardly into welding contact with the aligned wire crossing points to weld the corresponding wires together at these points and then retract the electrodes upwardly to permit movement of the unit to the next crossing points.

Briefly, during operation of the welding machine 10, the welding unit 26 is intermittently driven through the welding station 14 to weld the group and transverse wires 18, 22 to one another at their crossing points and is then returned to its original position. This action constitutes one welding cycle of the machine. Following completion of the first welding cycle, the group wire advancing means 19 is operated to advance the group wires 18 endwise through the welding station 14, and thereby transport the two currently welded transverse wires 22 from the welding station, a distance related to the desired spacing between the transverse wires. A second pair of transverse wires are then placed in the wire holding means 20 and the welding unit 26 is actuated to effect the second welding cycle during which the second transverse wire pair are welded to the group wires 18. This cyclic operation of the welding machine is repeated until the desired number of transverse wires have been welded.

Figure 2:
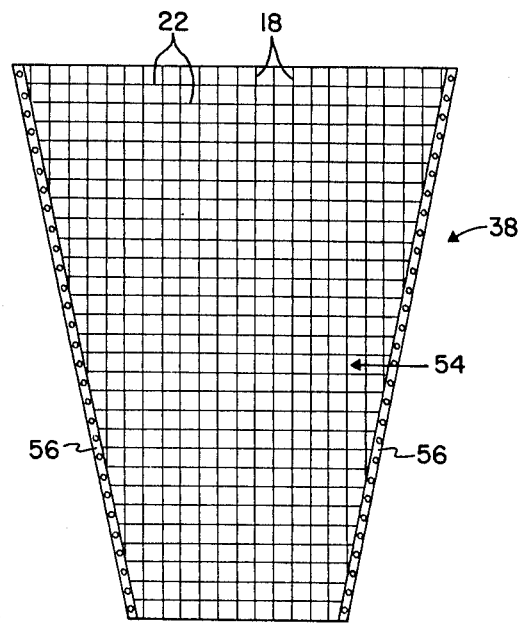
FIG. 2 is an enlarged flat layout of one gore.

As noted earlier, and will become readily evident from the ensuing description, a welding machine according to this invention may be constructed and arranged to fabricate a variety of welded wire networks for various purposes. FIG. 2 illustrates one type of wire network 38 which may be fabricated on the illustrated welding machine 10. The particular network shown is a gore adapted for assembly with other similar network gores to form the parabolic reflector dish 40 of the parabolic antenna 42 shown in FIG. 1.

The antenna 42 has a central cylindrical housing or hub 44 supported at its rear on an antenna mount 46. Fixed at their ends to and extending radially out from the hub are a number of uniformly spaced ribs 48. Ribs 48 curve forwardly relative to the hub with a parabolic curvature. Positioned between and secured along their radial edges to the ribs 48 and at their inner ends to the hub 44 are wire network gores 38 like that shown in FIG. 2. The ribs 48, gores 38, and the front face of the hub 44 conform to a parabolic surface. Fixed to and projecting from the front end of the hub along the axis of this surface is a strut 50 mounting the transmitting-/receiving element 52 of the antenna.

Turning to FIG. 2, each gore 38 has a wire network 54 proper and metallic edge strips 56 along the tapered radial edges of the gore. Wire network 54 has orthogonally disposed wires including wires, referred to herein as radial wires, extending in the radial direction of the gore, that is vertically in FIG. 2, and other wires, referred to as hoop wires, extending in the circumferential or hoop direction of the gore. The radial wires correspond to the earlier mentioned group wires and are designated by the numeral 18. The hoop wires correspond to the earlier mentioned transverse wires and are designated by the numeral 22. The hoop and radial wires are welded to one another at their crossing points. The edge strips are welded to the ends of the wires.

The welding machine 10 will now be described in greater detail with reference to fabricating the wire network gores 38. The machine frame 12 has a long narrow horizontal platform or table 58 supported on legs 60 and 62. The frame members which provide the end legs 62 project above the table 58. Joined to and extending between the upper ends of the frame members 62, a distance above the table 58, is a truss bridge 64. Truss bridge 64 movably supports the welding unit 26, as explained later.

Figure 3:
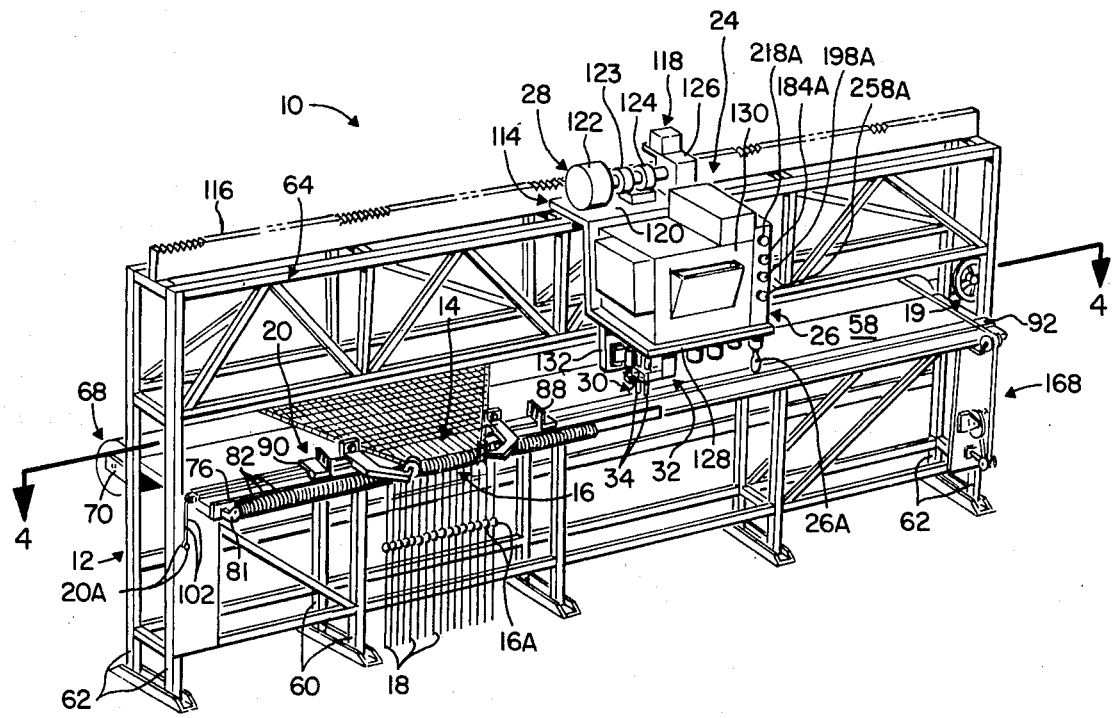
FIG. 3 is a perspective view of a wire network fabricating or welding machine according to the invention.
Figures 4, 4A:
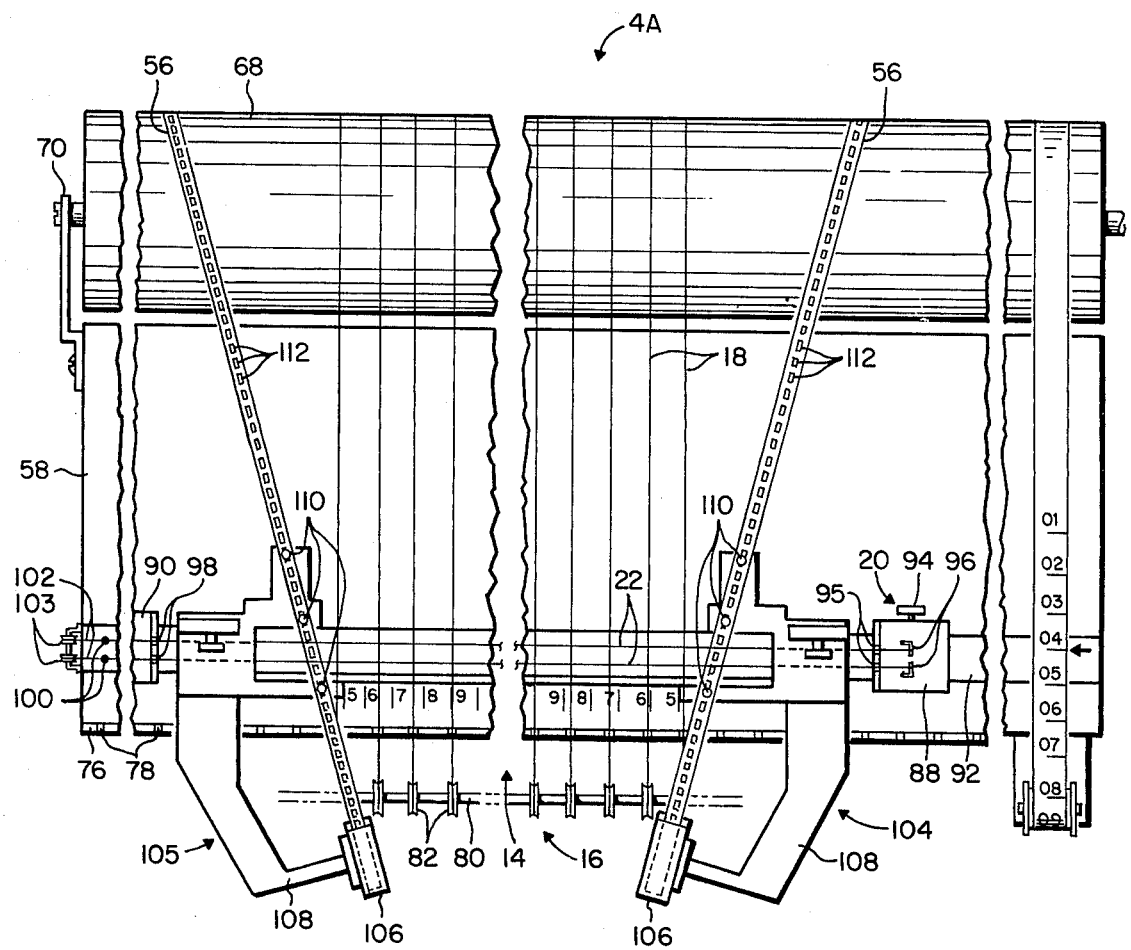
FIG. 4 is an enlarged view taken on line 4—4 in FIG. 3.
FIG. 4A is a view looking in the direction of arrow 4A in FIG. 4.
Figure 7:
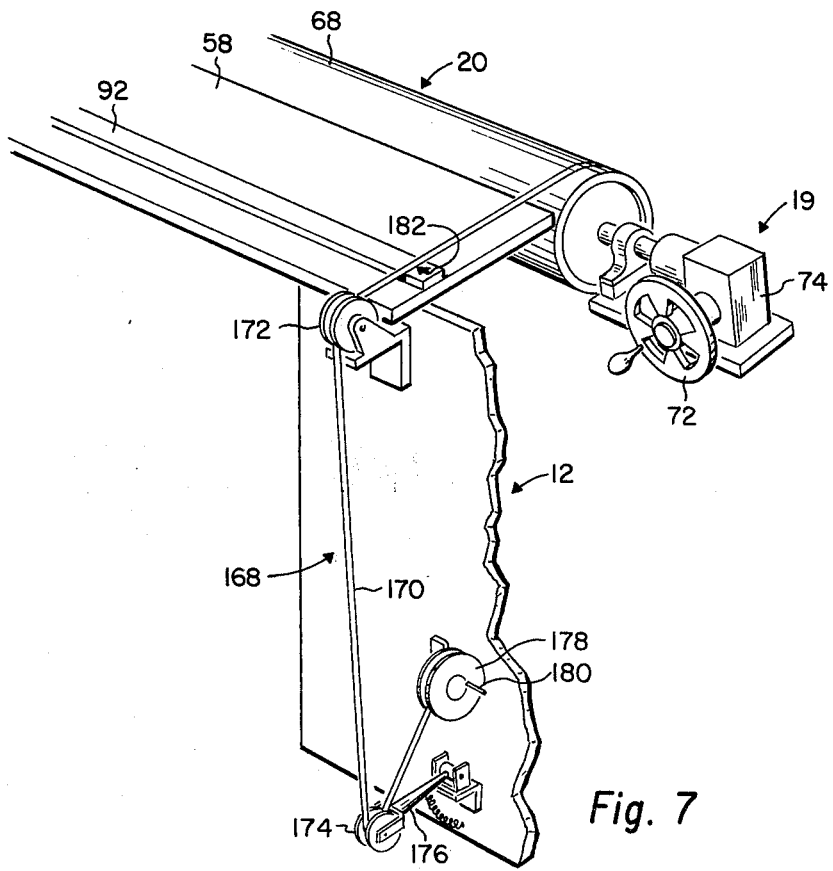
FIG. 7 is an enlarged fragmentary perspective view of the take-up drum and associated structure.

The wire holding means 16 of the welding machine supports the radial wires 18 of the gore 38 being fabricated. This wire holding means comprises a rotory take-up drum 68 which extends along the rear side of the frame table 58 and is rotatably supported at its ends by brackets 70 for rotation of the drum on an axis parallel to the longitudinal axis of the frame 12. Mounted on the right hand end of the frame in FIG. 3 is the wire advancing means 19. Referring to FIG. 7, this means comprises a handwheel 72 which is drivably coupled through a right angle reduction gear unit 74 to the adjacent end of the drum 68 for rotation of the drum by rotation of the handwheel. As will be explained later, at the conclusion of each welding cycle of the machine, the drum is rotated by the handwheel 72 to wind the radial wires 18 on the drum and thereby advance these wires through the welding station 14.

In addition to the drum 68, the wire holding means 16 comprises a wire guide 76 removably attached to the front edge of the frame table 58. This wire guide comprises a metal bar having slots 78 in its upper edge. The width of each slot approximates the diameter of the radial wires 18. Extending lengthwise of the wire guide 76, outboard of the guide, is a shaft 80, supported on the frame 12 by brackets 81 and rotatably mounting a number of peripherally grooved pulleys 82. Pulleys 82 are aligned with the wire guide slots 78, respectively. The bottom walls of the pulley grooves and the bottom walls of the guide slots are disposed in a common horizontal plane tangent to the upper side of the take-up drum 68 and located a distance above the frame table 58.

From the description to this point, it will be understood that the drum 68, wire guide 76, and pulleys 82 comprise the radial wire holding means 16. The radial wires 18 supported by the holding means extend in parallel side by side relation from the drum 68, through the wire guide slots 78 and over the pulleys 82. The rear or drum ends of the wires are secured to clips 86 (FIG. 4A) arranged in a row along the drum. The radial wire tensioning means 16a comprise weights clipped to the front freely hanging ends of the radial wires 16. These weights are adjustable along the wires.

The hoop wire holding means 20 comprises a pair of slides 88, 90 which are slidably mounted on a flat bar 92 fixed to the frame table 58 just behind the wire guide 76 and extending lengthwise of the table. The upper surface of this bar is located in the common plane which is tangent to the upper side of the take-up drum 68 and contains the bottom walls of the wire guide slots 78. Slides 88, 90 are adjustable along the bar 92 and have clamping screws 94 for clamping the slides in fixed positions along the bar. As will be explained later, the bar 92, in addition to providing a guide for the wire holding slides 88, 90, serves as an electrically conductive anvil for the welding means 24.

As noted earlier, wire holding means 20 supports the hoop wires 22 in orthogonal relation to the radial wires 18. The right hand ends of the hoop wires in FIG. 4 pass through guide slots 95 in the slide 88 and are fixed to clips 96 on the slide. The wires extend from the slide 88 through guide slots 98 in the slide 90 and are attached by clips 100 to wires 102 which pass around peripherally groove pulleys 103 mounted on the left end of the frame 12 in FIG. 4. The hoop wire tensioning means 20a comprise weights attached to the lower freely hanging ends of the clip wires 102.

As noted earlier, the finished gore 38 of FIG. 2 has metal edge strips 56. As shown best in FIG. 4, these edge strips extend from the take-up drum 68 forwardly in converging relation across edge strip locating slides 104, 105 on the anvil bar 92 between the slides 88, 90. The rear ends of the strips are secured to clips 86 on the drum. The forward ends of the strips are wound on spring load reels (not shown) within strip supply cartridges 106 mounted on forwardly extending arms 108 on the slides 104, 105. The included angle between the strips is the included angle of the gore 38. The slides 104, 105 have locating pins 110 which are insertable through locating holes 112 in the edge strips to locate the strips in fixed relation to the slides. Hoop wires 22 pass under slides 104, 105.

From the description to this point, it will be understood that the radial and hoop wires 18, 22 extend at right angles to one another and cross one another at crossing points located over the bar 92. The radial wires and the edge strips 56 are disposed in close proximity to or seating contact with the upper surface of the bar. The hoop wires overlie and are disposed in close proximity to or seating contact with the radial wires and edge strips. The region over the bar 92 between the slides 88, 90 and containing the crossing points of the wires and edge strips constitutes the welding station 14 of the welding machine.

Welding unit 26 comprises a carriage 114 which is movably supported in any convenient manner on the truss bridge 64 for movement along the bridge. The welding unit is located at the front side of the bridge, as the machine is viewed in FIG. 3, so as to pass over the welding station 14 during its movement along the bridge. As noted earlier, the welding unit is driven in its movement by an intermittent drive mechanism 28. This drive mechanism comprises a gear rack 116 and a drive unit 118. Gear rack 116 is fixed to the top and extends the length of the truss bridge 64 and has a row of rack teeth along its upper edge. Drive unit 118 is mounted on an upper horizontal platform 120 of the welding carriage 114 which extends over the top of the bridge toward the rack. The drive unit includes a gear 121 which meshes with the gear rack teeth and is driven by a reversible motor 122 through an electromagnetic clutch 123 and brake 124 and a right angle gear reduction unit 126. It will be understood, therefore, that the welding unit carriage 114 is propelled along the truss bridge 64 by energizing the motor 112, engaging the clutch 123, and disengaging the brake 124. The carriage may be abruptly stopped by disengaging the clutch and engaging the brake.

The welding carriage 114 has a lower horizontal platform 128 mounting a combination power supply and control unit 130 for the welding unit 26. This power supply-control unit will be described presently. Depending below the carriage platform 128 is a mounting plate 132 which supports the welding head 32 and the wire sensor 30.

Figure 6:
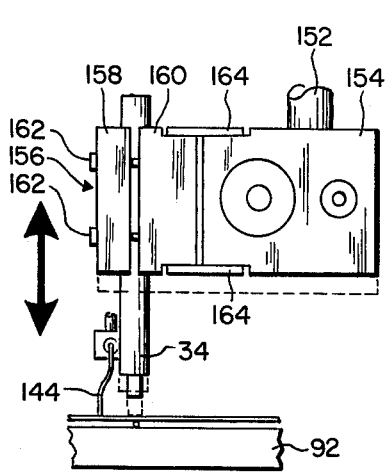
FIG. 6 is a further enlarged fragmentary view of the weld head looking in the direction of the arrow 6 in FIG. 5.
Figure 5:
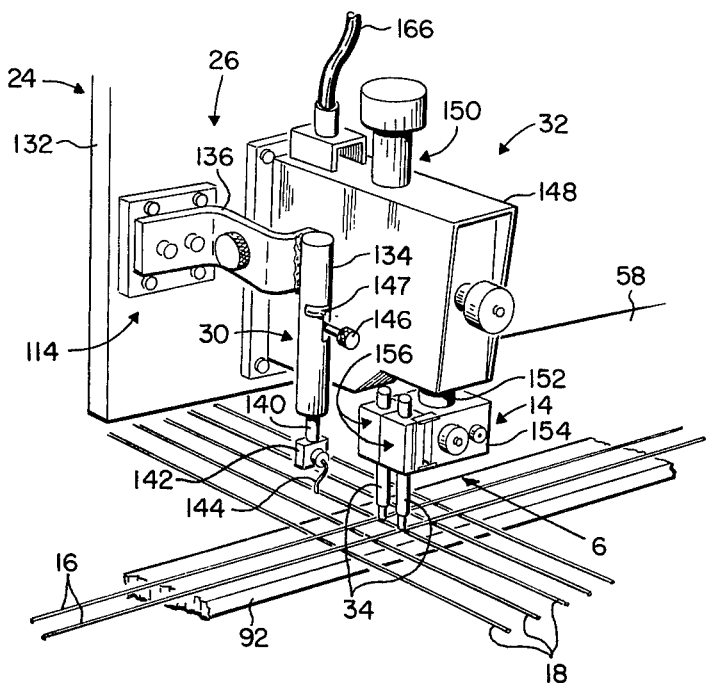
FIG. 5 is an enlarged perspective view of the weld head of the welding machine.

Referring particularly to FIGS. 5 and 6, the wire sensor 30 comprises a barrel 134 fixed in a vertical attitude to a bracket 136 attached to the mounting plate 132. Slidably in and extending below the barrel 134 is a rod 140 on the lower of which is a block 142. Block 142 carries a flexible wire sensing element or finger 144 which extends outwardly and downwardly from the block. The rod 140 is spring biassed downwardly to a position wherein the lower end of the finger is located to contact the radial wires 18 in succession as the welding unit 26 passes through the welding station 14. A screw 146 threaded in the rod and projecting through a bayonet slot 147 in the barrel provides a means for retaining the rod in an upper retracted position wherein the finger clears the radial wires.

Welding head 32 comprises a housing 148 which is firmly attached to the welding carriage plate 132 behind or to the right of the wire sensor 30, as the parts are viewed in FIG. 5. Within this housing is a penumatic actuator 150 having a vertical plunger 152 projecting below the housing. Fixed on the lower end of this plunger is a block-like head 154. Welding electrodes 34 are carried by individual electrode holders 156 located at the left or front side of the plunger head 154, as the welding head is viewed in FIG. 5. Each electrode holder comprises a pair of clamping plates 158, 160 between which the corresponding electrode is positioned and which are joined by clamp screws 162 to firmly grip the electrode. The electrode holders are individually resiliently mounted on the plunger head 154 by means of flexures 164 to permit limited axial or vertical movement of each electrode 34 relative to the plunger head. The electrodes are axially adjustable relative to their respective holders 156 by loosening the holder clamp screws 162.

As noted earlier, during operation of the welding machine 10, the welding unit 26 is driven through the welding station 14, intermittently in such a way that the unit is momentarily arrested in successive positions wherein the welding electrodes 34 are vertically aligned with the crossing points of the radial and hoop wires 18, 22. The electrodes are extended downwardly into contact with the wires at these crossing points to weld the wires to one another. This extension of the electrodes is accomplished by pressuring the pneumatic actuator 150 of the welding head 32, through an air hose 166, to extend its plunger 152, and thereby the plunger head 154, electrode holders 156 and electrodes 34, as shown in broken lines in FIG. 6. Extension of the electrodes into contact with crossing points of the wires 18, 22 presses the respective radial wire into contact with the underlying anvil bar 92. As will be explained presently, during each welding operation, welding current flows from one electrode, through the crossing wires and anvil bar to the other electrode to weld the crossing wires. The flexures 164 permit individual yielding of the electrodes to obtain relatively uniform contact pressure of the electrodes with the wires.

It will be recalled from the earlier description that the welding machine operation involves successive welding cycles. During each welding cycle, the welding unit 26 is driven through the welding station 14 to effect welding to the radial wires 18 and the edge strips 56, the two hoop wires 22 currently supported in the station by the hoop wire holding means 22. The welding unit is then retracted to its initial or home position and the radial wires are advanced through the welding station, to move the welded hoop wires from the station, by rotation of the take-up drum 68. The cycle is then repeated to weld two more hoop wires to the radial wires. This operation is repeated until the desired number of hoop wires have been welded.

Welding machine 10 is equipped with means 168 (FIG. 7) for measuring each advance of the radial wires 18 so as to obtain the desired spacing between adjacent hoop wires in the completed gore 38. Measuring means 168 comprises a measuring tape 170, one end of which is fixed to the take-up drum 68 adjacent the drum rotating handwheel 72. The tape extends forwardly from the drum over the frame table 58, then around a pulley 172 on the machine frame 12, then downwardly and around a pulley 174 on a spring loaded arm 176 pivoted on the frame, and finally to a take-up reel 178 rotatably mounted on the frame. Reel 178 contains a friction brake or other means for resisting rotation and has a handle 180 by which the reel may be rotated to wind the tape on the reel, as explained later. When the take-up drum 68 is rotated to advance the radial wires 18 through the welding station 14, the measuring tape 170 is wound on the drum and thereby advanced past a reference arrow 182 on the machine frame to indicate the distance through which the radial wires are advanced.

Figure 8:
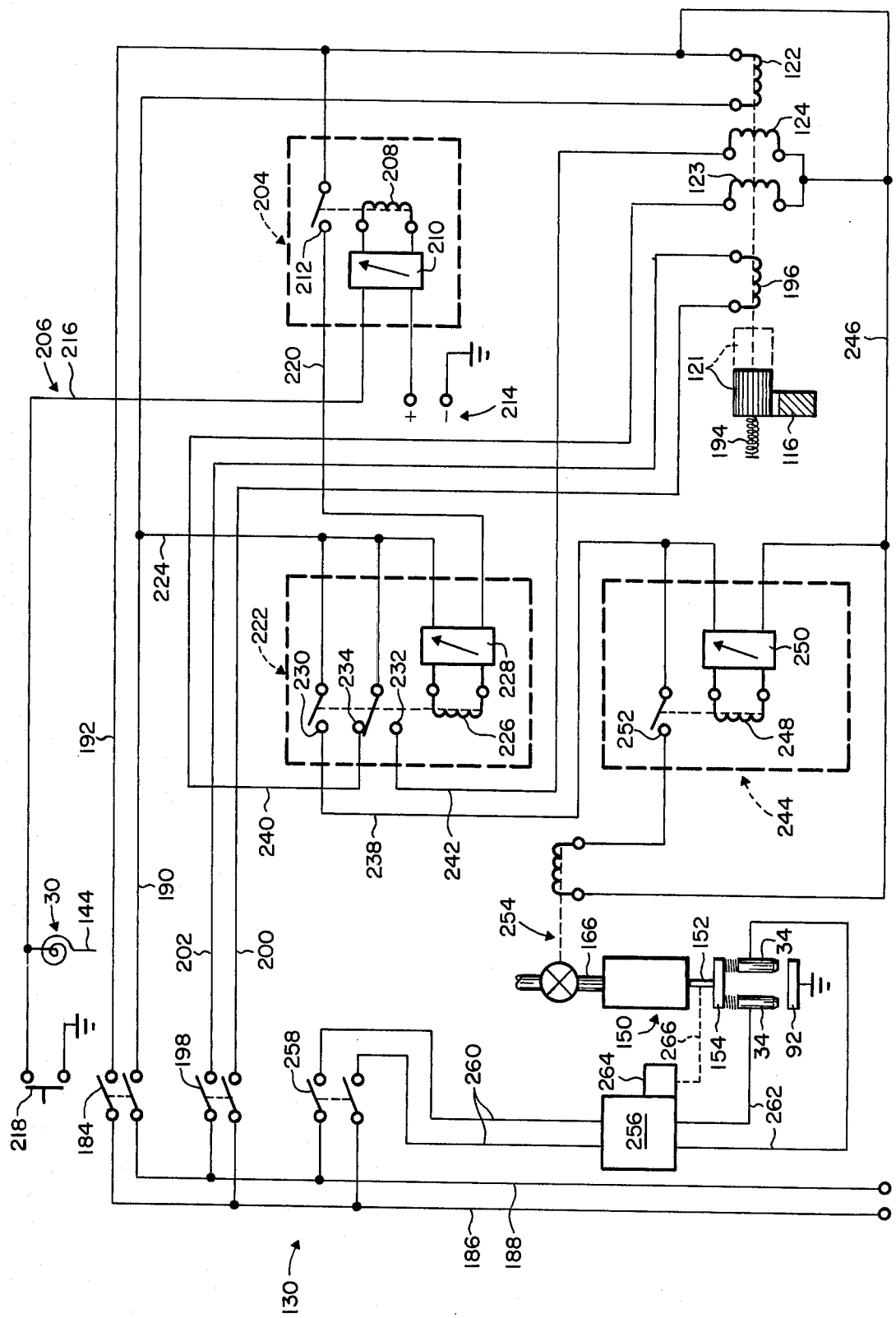
FIG. 8 is an electrical circuit diagram of the machine.

Referring now to the circuit diagram of FIG. 8, 184 is a power-on switch, closure of which connects a pair of electrical power mains 186, 188 to the welding carriage drive motor 122 thorugh a pair of circuit leads 190, 192 to energize the motor. As noted earlier, motor 122 drives the welding carriage drive gear 121 through the right angle gear reducer 126. Gear 121 is slidably keyed on the reducer output shaft for extension into and retraction from meshing engagement with machine frame gear rack 116, as indicated by full and broken lines in FIG. 8. A spring 194 on the reducer output shaft urges the gear to its broken line retracted position. The gear is extended to full line position of engagement with the gear rack by energizing of a gear extension solenoid 196 which is connected to the power mains 186, 188 through a welding carriage drive switch 198 and circuit leads 200, 202. It will now be understood that closure of the power-on switch 184 with the carriage drive switch 198 closed effects driving of the welding unit 26 along the frame truss bridge 64 by the motor 122. The direction of motor rotation is such as to drive the welding unit to the left in FIG. 3, through the welding station 14. Opening of the carriage drive switch permits operation of the motor 122 without driving the welding unit and movement of the unit along the frame by hand.

Indicated at 204 in FIG. 8 is an adjustable timing relay which, together with the radial wire sensor 30, comprises a radial wire sensing means or system 206. Relay 204 has a coil 208 which is energized through an adjustable timing circuit 210 and normally open contacts 212. One terminal of the timing circuit 210 is connected to one terminal of a low voltage source 214, the other terminal of which is grounded to the machine frame 12. The other terminal of the timing circuit is connected through a lead 216 to the wire sensing finger 144 of the wire sensor 30 and to one terminal of a trigger switch 218. The other terminal of the trigger switch is grounded to the machine frame. As explained below, timing circuit 210 is momentarily energized during operation of the welding machine, either by contact of the sensing finger 144 with a radial wire 18 or by closure of the trigger switch 218, and is activated by this momentary energization to energize the relay coil 208 and close its contacts 212 for a finite period of time. The timing circuit is adjustable, as indicated in FIG. 8, to vary this time period.

One terminal of the timing relay contacts 212 is connected to the circuit power lead 192. The other terminal of these contacts is connected through a lead 220 to one terminal of a time delay relay 222. Time delay relay 222 has a second terminal connected through a lead 224 to the circuit power lead 190. Thus, closure of the timing relay contacts 212 supplies electrical power to the time delay relay 222.

Time delay relay 222 has a coil 226 which is energized through an adjustable time delay circuit 228, normally open contacts 230, 232 and normally closed contacts 234. The time delay circuit 228 is connected to the leads 220, 224 so as to be energized by closure of the timing relay contacts 212. This energizing of the time delay circuit activates the latter to energize the relay coil 226 and thereby close the relay contacts 234 after a finite delay time. The time delay circuit 226 is adjustable, as indicated in FIG. 8, to vary this delay time. The time delay relay remains energized so long as the timing relay contacts 212 remain closed.

One terminal of the time delay relay contacts 228, 230, and 232 is connected to the circuit lead 224. The other terminals of these contacts are connected through leads 238, 240, and 242 to one terminal of a second time delay relay 244, one terminal of the welding unit clutch 123, and one terminal of the welding unit brake 124, respectively. The other terminals of the relay 244, clutch 123, and brake 124 are connected to the circuit power lead 192 through a common lead 246. Thus, when the contacts 230, 232, and 234 of the time delay relay 222 occupy their normal positions of FIG. 8, the time delay relay 244 and brake 124 are de-energized and the clutch 123 is energized. Actuation of the contacts 230, 232, and 234 by energizing of the coil 226 of the time delay relay 222 energizes the time delay relay 244 and the brake 124 and de-energizes the clutch 123. The clutch and brake are engaged when energized and disengaged when de-energized.

Time delay relay 244 has a coil 248 which is energized through an adjustable time delay circuit 250 and normally open contacts 252. Time delay circuit 250 is connected to the leads 238, 246 so as to be energized by closing of the contacts 230 of the time delay relay 222. This energizing of the delay circuit 250 activates the circuit to energize the relay coil 248 and close its contacts 252 after a finite delay time. The time delay circuit 250 is adjustable, as indicated in FIG. 8, to vary this time delay. Time delay relay 244 remains energized so long as the time delay relay 222 remains energized and hence so long as the timing relay contacts 212 remain closed.

One terminal of the contacts 250 of time delay relay 244 is connected to the lead 238. The other terminal of these contacts is connected to one terminal of a normally closed solenoid valve 254 for controlling air-flow to the welding electrode actuator 150. The other valve terminal is connected to lead 246. Closure of the contacts 252 thus energizes the valve 254 to open the latter and admit pressure fluid to the actuator for extending the weld head to welding position. Reclosure of the valve by opening of the contacts 252 vents the actuator to permit retraction of the weld head under the force of a spring (not shown) within the actuator.

D-C welding current is supplied to the welding electrodes 34 by a power source 256. This power source is energized from the power mains 186, 188 through a weld power switch 258 and leads 260. The power source output is connected to the electrodes 34 through leads 262 which are electrically connected to the individual electrodes, as shown in FIG. 8. Weld power source 256 includes a switching means 264 which is operatively connected to the plunger 152 of the weld head actuator 150, as indicated by the broken line 266, so as to be actuated upon extension of the welding electrodes 34 to welding position and which, when so actuated, triggers the power source to deliver a predetermined pulse of welding current to the electrodes.

From the foregoing description of the circuit diagram of FIG. 8, it will be understood that closure of the power-on switch 184 energizes the welding unit drive motor 122. Assuming the trigger switch 218 to be open and the radial wire sensor finger 144 to be ungrounded, the motor will drive the welding unit drive gear 121 through the then engaged clutch 123 and disengaged brake 124. If the weld carriage drive switch 198 is closed, gear 121 will occupy its full line extended position of FIG. 8 so that rotation of the gear by the motor 122 will drive the welding unit 26 to the left along the frame bridge 64. If switch 198 is open, the gear will occupy its broken line retracted position, and the welding unit will remain stationary and free for manual movement along the frame bridge.

Assume now that either the trigger switch 218 is momentarily closed or the radial wire sensor finger 144 is momentarily grounded. In this event, the timing relay 204 is energized to close its contacts 212 for a preset time period. Closure of these contacts energizes the time delay relay 222 to effect closure of its contacts 230, 232 and opening of its contacts 234 after a preset time following energizing of the relay. This actuation of the time delay relay contacts 230, 232, and 234 immediately disengages the clutch 123 and engages the brake 124 of the welding unit 26 to terminate driving of its gear 121 while its motor 122 continues to turn, and energizes the time delay relay 244. After a preset time delay following energizing of the relay 244, and hence following disengagement of the clutch 123 and engagement of the brake 124, the relay contacts 252 close to effect extension of the welding electrodes 34 to welding position. Actuation of the weld power source switching means 264 upon extension of the welding electrodes 34 to welding position triggers the power source 256 to deliver a current pulse to the electrodes.

The machine remains in this condition until expiration of the time interval which is preset into the timing relay 204. Expiration of this time interval effects reopening of the timing relay contacts 212 to de-energize the time delay relays 222, 244 and thereby effect reengagement of the clutch 123 and disengagement of the brake 124 to cause driving of the gear 121. The welding electrodes 34 are simultaneously retracted from welding position.

Switches 184, 198, 218, and 258 are actuated by buttons 184a, 198a, 218a, and 258a mounted on the front side of the welding unit 26, as shown in FIG. 3.

The operation of the welding machine will now be described in connection with fabricating the gore 38 of FIG. 2. Initially, the gore radial wires 18 are placed in the wire holding means 16 in the manner explained earlier and shown in the drawings so that the wires extend between the take-up drum 68 and wire guide 76 and through the welding station in spaced parallel relation. In this regard, it is significant to note that the wire guide slots 78 and drum wire clips 86 are aligned and equally spaced to locate the radial wires in their illustrated spaced parallel relation. The tensioning weights 16a are now attached to the wires 18, as shown in FIG. 3.

The edge strip locating slides 104, 105 are positioned along the anvil bar 92 to provide a spacing between the edge strips 56, at the welding station 14, equal to the width of the wide end of the gore. A scale may be provided to facilitate this positioning of the slides. The edge strips 56 are then pulled rearwardly from their cartridges 106 and secured at their ends to clips 86 on the drum in such a way that the strips diverge from the cartridges to the drum at oblique angles relative to the radial wires 18 equal to the oblique angles between the edge strips and radial wires of the finished gore 38 and the strips overlie the locating pins 110 on the slides 104, 105. The strips are then engaged with the locating pins to positively locate the strips at the proper angles and spacing within the welding station 14. In this regard, it is significant to note in FIG. 4 that the locating pins and strip cartridge on each slide 104, 105 are aligned on a common axis which coincides with the longitudinal axis of the corresponding edge strip when properly positioned in the machine.

After placement of the radial wires 18 and edge strips 56 in the machine, a first pair of hoop wires 22 are placed in the wire holding means 20. These hoop wires are fixed at their right ends in FIG. 4 to the clips 98 on the hoop wire slide 88 and extend to the left from these clips through the guide slots 95 on the slide, then under the edge strip slide 104 and through the welding station 14 over the radial wires 18 and edge strips 56, and then under the edge strip slide 105 and through the guide slots 98 on the hoop wire slide 90. The clips 100 on the weighted tensioning wires 102 are fixed to the ends of the hoop wires to tension the latter.

At this point, the power-on switch 184 and weld power switch 258 are closed and the welding unit 26 is moved manually, by means of a handle 26a on the unit, from its initial position of FIG. 3 to a position wherein at least one of the welding electrodes 34 is aligned with the right-hand edge strip 56. The sensing finger 144 of the radial wire sensor is locked in its upper retracted position during this manual positioning of the welding unit so that the finger will not contact the edge strip. After this electrode alignment has been accomplished, the trigger switch 218 is closed momentarily to energize the relays 204, 222, and 244 in the manner explained earlier. Energizing of relay 244 effects extension of the welding electrodes 34 to welding position, wherein one or both hoop wires 22 and the right hand edge strip 56 are firmly clamped at their crossing point or points between the electrodes and the anvil bar 92. This extension of the electrodes triggers the weld power source 256 to apply a current pulse to the electrodes to effect welding of one or both hoop wires to the edge strip by welding current flow from one electrode to the other through the anvil bar and the clamped hoop wire — edge strip crossing points. The timing circuit 210 of the timing relay 204 is set to maintain the electrodes 34 in welding position following the welding current pulse for a period sufficient to effect cooling of the weld to a nugget. The timing relay contacts 212 then reopen to effect retraction of the electrodes.

In connection with the above welding of the hoop wires 22 to the edge strip 56, it is evident that depending upon the width and angle of the edge strip and the spacing between the hoop wires and hence the spacing between the electrodes, it may be possible to align both electrodes with the edge strip at the same time, in which case both hoop wires may be welded to the edge strip simultaneously. If only one electrode may be aligned with the edge strip at a time, to two hoop wires must be welded to the edge strip one at a time by aligning first one electrode and then the other electrode with the edge strip and actuating the welding unit each time as described above.

After welding of the wires to the edge strip 96, the welding unit 26 is again moved by hand to the left in FIG. 3 to a position wherein the radial wire sensing finger 144 clears the edge strip and the finger is extended downwardly to a position between the edge strip and the first radial wire 18. The machine is then placed in its automatic mode by closing the welding unit drive switch 198 to engage the welding unit drive gear 121 with the rack 116. Since the sensing finger is then ungrounded by contact with a radial wire, relays 204, 222, and 244 will be de-energized, clutch 123 will be engaged, and brake 124 will be disengaged. Accordingly, the welding unit is driven to the left through the welding station 14 by its drive motor 122.

Left-hand travel of the welding unit 26 by its drive motor 122 continues until the sensing finger 144 contacts the first radial wire 18. The finger is then grounded through the wire, thereby energizing the relays 204, 222, and 244 in the manner explained earlier to first arrest the welding unit and then extend its electrodes to welding position. In this regard, it will be recalled from the earlier description concerning the relays that grounding of the sensing finger 144 effects immediate actuation of the timing relay 204 to start the timing of a preset time period, determined by the setting of the relay timing circuit 210, subsequent actuation of the time delay relay 222 to disengage the clutch 123 and engage the brake 124 of the welding unit and thereby arrest the unit after a preset time delay determined by the setting of the relay delay circuit 228, and final actuation of the time delay relay 244 to extend the welding electrodes to welding position after a further preset time delay determined by the setting of the relay delay circuit 250.

Thus, the welding unit 26 is not arrested immediately upon contact of the sensing finger 144 with the first radial wire 18 but rather continues its left-hand travel following such contact for a period of time equal to the preset time delay of relay 222. This continued travel of the welding unit results in movement of the sensing finger over and beyond the radial wire 18 and following movement of the welding electrodes 34, which trail the finger by a small distance, as shown in FIG. 6, toward the radial wire. The sensing finger is flexible to permit it to pass over the radial wire. The time delay relay 222 is set to a time delay such that the welding unit is finally arrested in a position wherein the sensing finger is beyond and out of contact with the first radial wire, and the electrodes are located directly over the crossing points of the latter wire and the hoop wires 22.

Arresting of the welding unit 26 occurs quite abruptly and produces some vibration or oscillation of the welding electrodes 34 and other parts of the unit. The time delay relay 244 is set to a time delay sufficient to permit damping out of these vibrations and oscillations prior to extension of the electrodes to welding position. At the end of this delay, the relay 244 is actuated to effect extension of the electrodes to their welding positions wherein they press the underlying crossing wires 18, 22 against the anvil bar 92. During this extension, the weld power source switch 264 is actuated to deliver a pulse of welding current to the crossing wires to weld the latter to one another.

The welding electrodes 34 remain in welding position to effect cooling of the welds until expiration of the time period preset into the timing relay 204. This time period is made sufficiently long to accommodate the welding actions described above and cooling of the resulting welds at least to their solidification temperature. The timing relay contacts 212 then reopen to de-energize the relays 222, 244 and thereby effect retraction of the welding electrodes 34 and engagement of the clutch 123 and disengagement of the brake 124 of the welding unit 26. Left-hand travel of the welding unit through the welding station 14 then resumes until the sensing finger 144 contact the second radial wire 18, whereupon the above described operation of the machine is repeated to weld the latter wire to the hoop wires 22. This same welding operation occurs automatically at each radial wire as the welding unit proceeds through the welding station.

It will now be understood, therefore, that contact of the sensing finger 144 with each wire 18 effectively generates a stop signal which effectively inactuates the welding unit drive mechanism 28 to arrest the welding unit for a preset time period, during which the welding electrodes 34 are extended to welding position to weld the underlying crossing wires. The stop signal is then removed to reactuate the drive mechanism for driving the welding unit to the next wire 18.

Following welding of the last radial wire 18 to the hoop wires 22, the carriage drive switch 198 is reopened and the wire sensing finger 144 is retracted to restore the machine to its manual mode. The two hoop wires are then welded to the second edge strips 56 by manual operation of the machine in the same manner as described earlier in connection with the right-hand edge strip. The welding unit 26 is then returned by hand to its initial position of FIG. 3, thereby completing one welding cycle of the machine.

The welding machine is conditioned for the next welding cycle by detaching the ends of the two welded hoop wires 22 from the wire holding means 20, removing the edge strips 56 from their locating pins 110 on the strip positioning slides 104, 105, and adjusting the slides to the proper edge strip spacing for the next two hoop wires to be welded. The drum 68 is then rotated to advance the radial wires 18 and edge strips 56 through the welding station to locate within the station the portions of the edge strips to which the next two hoop wires are to be welded and the edge strips are re-engaged with their locating pins. This advancing of the radial wires and edge strips is done with the aid of the measuring tape 170, to obtain the desired spacing between the hoop wires in the finished gore 38. Finally, a new pair of hoop wires are placed in the wire holding means 32 and the welding cycle described above is repeated to weld the new hoop wires to the radial wires and edge strips. This machine operation is repeated until the desired number of hoop wires have been welded.

It should be noted here that in the particular gore 38 illustrated, the radial wires 18 and certain of the hoop wires 22, cross one another over the edge strips. These crossing points of the wires are welded during welding of the wires to the edge strips in the manner described above.

In order to provide a finished gore, it is necessary to trim off the radial and hoop wires 18, 22 flush with the edge strips 56. This can be done immediately after welding of the wires.

Figure 9:
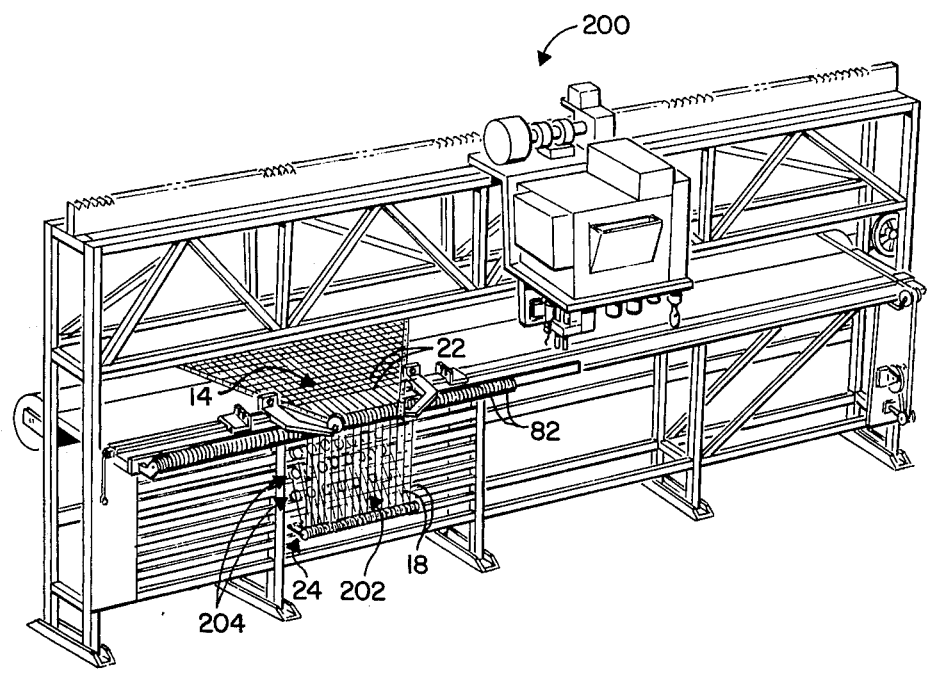
FIG. 9 is a perspective view of a modified welding machine.
Figure 10:
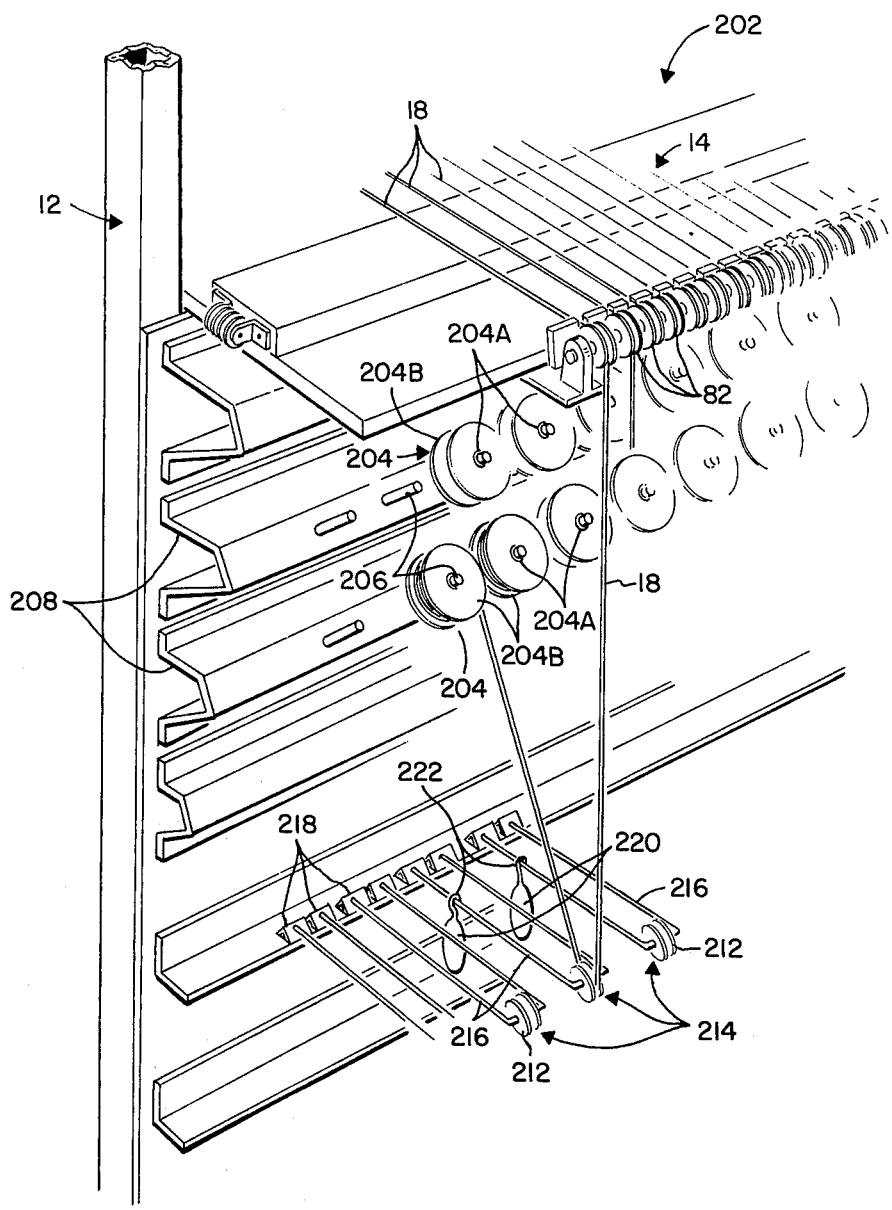
FIG. 10 is an enlarged perspective view of a modified wire tensioning mechanism embodied in the welding machine of FIG. 9.

The modified welding machine 200 of FIGS. 9 and 10 is identical to that of FIGS. 1 through 8 except for its modified group of radial wire tensioning mechanism 202. the transverse wires 22 and their holding means 20 have been omitted from FIG. 10 for the sake of clarity. Referring particularly to FIG. 10, this modified tensioning mechanism comprises a number of wire supply reels 204, which may be simple fishing reels, mounted side by side on studs or spindles 206 releasibly secured to horizontal channels 208 arranged one over the other on the machine frame below the welding station 14. If desired, spindles 206 may extend through longitudinal slots 210 in the channels and may be releasibly secured to the channels by lock nuts or the like in such a way as to permit adjustment of the spacing between the spindles and removal and addition of reels. Each reel has a central hub 204a removably fitted on and keyed against rotation relative to its spindle, an outer spool 204b rotatable on the hub, and an adjustable brake mechanism operative between the hub and spool for exerting a frictional drag on the spool resisting its rotation. The brake mechanism is adjustable to vary this drag force.

The group or radial wires 18 are wound on the wire supply reels 204. Each wire extends from its reel, downwardly around the pulley 212 of a wire tensioning device 214, then upwardly and around one of the wire pulleys 82, and then rearwardly through the welding station 14 to the take up drum 68, as explained earlier. Each wire tensioning device 214 comprises an arm 216 pivotally attached at one end to brackets 218 secured to a lower frame channel 208 in such a way that the arm can hinge or swing vertically. For reasons to be explained presently, the arm and bracket have coacting means (not shown) which limit upward swinging of the arm to some fixed angle, say on the order of 30°, above the horizontal. The pulley 212 of the tensioning device is rotatably mounted on the outer end of the arms. Supported on the arm for adjustment along the arm is a weight 220. The weight is attached to the arm by gripping means 222, such as a clamp, which normally holds the weight in a fixed position along the arm and may be released to hold the weight in a fixed position on the arm.

In the illustrated tensioning mechanism 202, each supply reel 204 contains a single radial wire 18. However, each reel might contain two or more separate wires by providing the reel spools 204b with partitions, such as rubber rings, between the outer spool flanges for dividing each spool into a number of separate spool portions equal to the number of wires to be wound on the spool. When such multiple wire spools are utilized, each wire on each spool will have its own tensioning device 214.

From the foregoing description of the wire tensioning mechanism 202, it will be understood that if the tensioning arms 216 are situated between the limits of their vertical swinging movement, each arm will exert on its respective radial wire 18 a tension force or load which is related to the position of the corresponding weight 220 along the arm and is adjustable by adjustment of the weight along the arm. Each weight is adjusted to establish the desired tension in its radial wire, and the brake of the corresponding wire reel 204 is adjusted to exert on the reel spool 204b a retarding force corresponding to a wire tension slightly greater than that produced in the radial wire by the tensioning arm. The tensioning weights are set to produce a uniform tension in all the radial wires.

The operation of the modified welding machine 200 is identical to that of FIGS. 1 through 8 except for the tensioning mechanism 202. Accordingly, it is unnecessary to repeat the machine operation in detail. Suffice it to say that following each welding cycle of the machine during which a pair of transverse wires 22 are welded to the radial wires 18, the radial wires are advanced through the welding station 14 by rotation of the wire take up drum 68, as in the machine of FIGS. 1 through 8. In the modified welding machine, however, this advancement of the radial wires first pulls the tensioning arms 216 upwardly against their upper stops, to limit upward swinging of the arms, and then pulls the wires from their supply reels 204. In order to re-establish the proper radial wire tension following each advancement of the radial wires, the drum 68 is first rotated to advance the wires through the welding station 14 to positions slightly beyond the point at which the next transverse wires are to be welded. The drum is then backed off, that is rotated in the opposite direction, just enough to effect reverse movement of the radial wires, under the force of the tensioning devices 214, to the proper welding positions. This reverse movement or backing off allows the tensioning arms to swing downwardly away from their upper stops and thereby re-establish the proper uniform tension in the radial wires.

It will be immediately recognized by those versed in the art that the described means for automatically intermittently advancing and positioning the unit 26 may be utilized for other than the described welding applications. For example, the unit could carry a glue dispenser for dispensing glue to wires or other work elements disposed in spaced relation within the station 14.

We claim:
1. A welding machine for fabricating a wire network comprising:
   a frame having a welding station;
   first wire holding means on said frame for supporting a group of first wires in side by side fixed relation within said welding station;
   second wire holding means on said frame for supporting at least one second wire in fixed welding position within said station wherein the latter wire extends in a transverse direction of said first wires, whereby said first and second wires cross one another;
   welding means on said frame for welding said first and second wires to one another at their crossing points, said welding means comprising a carriage mounted on said frame for movement through said welding station in said transverse direction, a welding electrode on said carriage, means for driving said carriage through said station in a manner such that movement of said electrode occurs along the second wire in welding position and across said wire crossing points in succesion, means on said carriage for sensing the successive wire crossing points during movement of said carriage through said welding station and producing a stop signal in response to sensing of each crossing point, control means for activating said drive means to drive said carriage in the absence of a stop signal and inactivating said drive means to arrest said carriage for a predetermined time interval in response to each stop signal and in a position wherein said electrode is aligned with the corresponding wire crossing point, and means for retracting said electrode from contact with said wires during movement of said carriage from one wire crossing point to the next and extending said electrode into contact with the aligned wire crossing point each time the carriage is arrested at a wire crossing point; and
   said first wire holding means including means for intermittently advancing said first wires endwise through said welding station, whereby second wires may be welded to said first wires at positions spaced along the first wires to form a wire network.
2. A welding machine according to claim 1 wherein:
   said network has metal edge strips at the ends of said second wires;
   said wire holding means includes means for supporting said edge strips at opposite sides of said group of first wires and in crossing relation to the second wire in welding position; and said welding means is adapted to weld said edge strips and second wire at their crossing points.
3. A welding machine according to claim 2 wherein:
   said edge strip supporting means includes means for positively locating said edge strips relative to one another within said welding station to maintain a fixed spacing between the crossing points of the strips and second wire in welding position.
4. A welding machine according to claim 3 wherein:
   said edge strip locating means are adjustable lengthwise of the second wire in welding position to ajust said fixed spacing.

5. A welding machine according to claim 4 wherein:

said network is a tapered gore for a parabolic disk; and said wire holding means support said first wires in parallel relation, said second wires in orthogonal relation to said first wires, and said edge strips in oblique angular relation to said wires.

6. A welding machine according to claim 5 wherein:

said sensing means comprises a sensing element engagable with said first wires; said first wire holding means comprises a take-up drum having means for attachment to one end of said first wires and edge strips; and said first wire advancing means comprises means for rotating said drum to wind said first wires and edge strips on the drum.

7. A welding machine according to claim 1 wherein:

said electrode engaging means comprises means for extending said electrode to welding position for the remainder of said time interval after a predetermined time delay following inactivation of said drive means in response to said stop signal.

8. A welding machine according to claim 1 wherein:

said sensing means comprises a sensing element slightly ahead of said electrode engagable with said first wires in succession and means for producing said stop signal upon contact of said sensing element with each first wire, said control means comprises means, for inactivating said drive means for said predetermined time interval after a predetermined initial time delay following each stop signal, and said electrode engaging means comprises means for extending said electrode to welding position for the remainder of said time interval after a predetermined time delay following inactivation of said drive means in response to said stop signal.

* * * * *